(12) United States Patent
Hanscom

(10) Patent No.: US 7,747,809 B2
(45) Date of Patent: Jun. 29, 2010

(54) MANAGING PCI EXPRESS DEVICES DURING RECOVERY OPERATIONS

(75) Inventor: Jeffrey C. Hanscom, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/033,298

(22) Filed: Feb. 19, 2008

(65) Prior Publication Data

US 2009/0210607 A1    Aug. 20, 2009

(51) Int. Cl.
*G06F 13/36* (2006.01)
(52) U.S. Cl. .................. 710/314; 710/313; 710/309; 714/43; 714/44
(58) Field of Classification Search ......... 710/306–317; 714/43–44
See application file for complete search history.

(56) References Cited

U.S. PATENT DOCUMENTS

| | | | |
|---|---|---|---|
| 7,191,255 B2 * | 3/2007 | Wong et al. ............... 710/5 |
| 7,231,480 B2 * | 6/2007 | Woodral .................... 710/302 |
| 7,281,077 B2 * | 10/2007 | Woodral .................... 710/310 |
| 7,398,427 B2 * | 7/2008 | Arndt et al. ................ 714/43 |
| 7,426,597 B1 * | 9/2008 | Tsu et al. .................. 710/307 |

OTHER PUBLICATIONS z/Architecture Principles of Operation, International Business Machines Corporation, SA22-7832-05, Sixth Edition (Apr. 2007) Downloaded as 4 separate attachments due to large size. 1,215 pages total.

\* cited by examiner

*Primary Examiner*—Raymond N Phan
(74) *Attorney, Agent, or Firm*—Cantor Colburn LLP; Joe Biela

(57) ABSTRACT

A PCI Express system comprising: a PCI Express adapter; and a PCI Express root complex coupled to the PCI Express adapter, the PCI root complex including: a protocol stack coupled to the PCI express adapter and configured to transmit information to and receive information from the PCI express adapter; an application specific logic module; and a fencing module coupled between the application specific logic module and the protocol stack and configured to, when in operation, block all signals from the application specific logic module from reaching the protocol stack.

18 Claims, 4 Drawing Sheets

MANAGING PCI EXPRESS DEVICES DURING RECOVERY OPERATIONS

BACKGROUND OF THE INVENTION

This invention relates generally to computer operation during recovery operations, and more particularly to managing PCI Express devices during recovery operations.

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation, or the extension of PCI known as PCI-X. More recently, PCI Express, a standard interface incorporating PCI transaction protocols at the logical level, but using serial data transfer at the physical level has been developed to offer better performance than PCI or PCI-X.

Host systems are used in various network applications, including TCP/IP networks, storage area networks ("SANs"), and various types of external device attachment. In SANs, plural storage devices are made available to various host computing systems. Data is typically moved between plural host systems and storage systems (or storage devices, used interchangeably throughout this specification). The connectivity between a host system and networks or external devices is provided by host bus adapters ("HBAs"), which plug into the host system. HBAs may attach to the host system via a standard interface such as PCI Express.

PCI Express is a low-cost, scalable, switched, point-to-point, serial I/O inter-connection scheme that maintains backward compatibility with PCI. PCI Express provides a number of benefits over existing bus standards, including increased bandwidth availability and support for real-time data transfer services. PCI Express provides quality of service, power management, and I/O virtualization features. Quality of service and power management improve data integrity and allow control of power consumption. I/O virtualization allows data to be routed along logical routes, permits allocation of bandwidth to groups of devices, and provides the ability to prioritize traffic streams.

PCI Express, however, imposes a specific relationship between I/O devices and a PCI Express Root complex. When going through a recovery action in a PCI Express root complex, the attached adapters may have relevant information that is needed for debug purposes. The PCI Express protocol specifies sticky bits in configuration space (typically stored in configuration registers located in the PCI Express adapter) which must stay valid after a reset recovery action. All other memory regions and other pertinent memory space in the adapter may be reset during such actions.

To ensure that this information stays valid for debug purposes while the root complex is being recovered due to an error scenario, the connection needs to appear to remain open. The only known way to do this is described above with respect to the sticky bit schema.

BRIEF SUMMARY OF THE INVENTION

Some or all of the embodiments of the present invention provide a fence module and multiple clock domains as well as a link quiescence mechanism to keep the PCI Express adapter active and its memory contents viable while the recoverable section of the root complex is logged and reset. This allows for the greatest debug capability and flexibility in recovery actions.

One embodiment of the present invention is directed to a PCI Express system. The system of this embodiment includes a PCI Express adapter and a PCI Express root complex coupled to the PCI Express adapter. The PCI Express root complex of this embodiment includes a protocol stack coupled to the PCI express adapter and configured to transmit information to and receive information from the PCI express adapter. The PCI express root complex of this embodiment also includes an application specific logic module, a fencing module coupled between the application specific logic module and the protocol stack which, when in operation, blocks all signals from the application specific logic module from reaching the protocol stack.

Another embodiment of the present invention is directed to a computer program product including a computer readable medium with program segments for, when executed on a computer device, causing the computer device to implement a method for performing a recovery operation in a PCI Express root complex, the method comprising: determining that a portion of the PCI root complex requires a recovery operation; receiving at an arbiter module an indication that a portion of the PCI root complex requires a recovery operation; providing a disable signal to a PCI Express adapter which disables write functionality of the PCI Express adapter; and returning all flow control credits to a PCI protocol stack.

Another embodiment of the present invention is directed to a method of performing a recovery action on an application specific logic module of a PCI Express root complex comprising: receiving a fencing signal at a fencing module; blocking, in the fencing module, all signals received from the application specific logic module from reaching a portion of the PCI Express root complex which is capable of communication with a PCI Express adapter; and returning all flow control credits to the PCI Express adapter.

BRIEF DESCRIPTION OF THE DRAWINGS

Referring now to the drawings wherein like elements are numbered alike in the several FIGURES.

DETAILED DESCRIPTION OF ILLUSTRATIVE EMBODIMENTS

An illustrative embodiment of the present invention provides a fence module and multiple clock domains to allow for improved recovery action performance, as well as an acquiescence mechanism to keep the PCI link alive and its memory contents viable while the recoverable section of the root complex is logged and reset.

Figure 1:
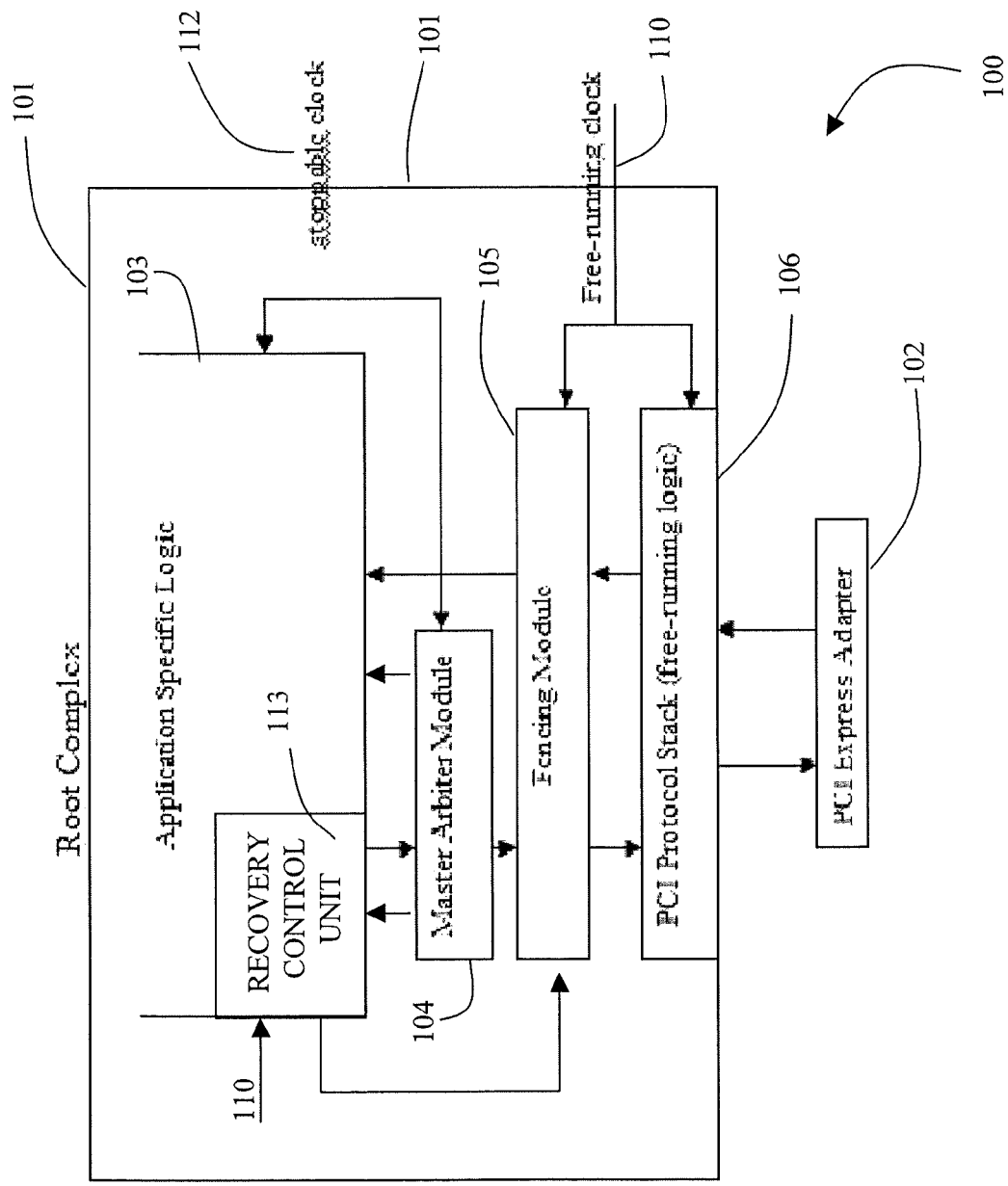
FIG. 1 is a schematic of an example of a PCI Express System according to an embodiment of the present invention.

FIG. 1 shows a schematic of an example of a PCI Express system according to one embodiment of the present invention. In some embodiments, the PCI express system 100 may include at least two portions. The first portion is the root complex 101 and the second portion is the PCI express adaptor 102. In this example system 100, the PCI root complex module 101 connects the processor and memory subsystems (not shown) to the PCI express adaptor 102 (sometimes called a PCI express endpoint). In general, the PCI root complex 102 generates transaction requests on behalf of a central processor (not shown). The PCI root complex 102 may be implemented as a discreet device, or be integrated with the central processor, and may contain more than one PCI Express adapter so that multiple switch devices can be connected to the ports on the PCI root complex or cascaded, as is well known in the art.

The PCI Express adaptor 102 includes memory devices such as arrays, latches and/or configuration registers, which may contain data that may be needed in the event of a root complex recovery. As discussed in greater detail, PCI link configuration information contained in the root complex configuration registers is stored in the fencing module 105 and used during a recovery operation while the fence is active. After the Root complex recovery reset, the root complex configuration registers are reloaded with the values stored prior to recovery and then the fence is dropped. In some embodiments this may allow the recovery action to appear transparent to the PCI link as a whole allowing the adapter to maintain an active PCI link and retain it memory contents which can then be logged by the root complex after recovery As shown the root complex 101 includes application specific logic module 103, a master arbiter module 104, a fencing module 105, and a PCI protocol stack 106. As shown, the master arbiter module 104 is a discreet element within the root complex 101 coupled to a single application specific logic module, the master arbiter module 104 may actually be a separate unit that is connected to application specific logic modules. If more than one application specific logic module 103 is coupled to the master arbiter module 104, the master arbiter module 104 may coordinate access to the PCI Express adapter 102 between the multiple application specific logic modules 101.

The application specific logic module 103 (also referred to herein as recoverable logic) is a set of instructions that govern how a specific application may operate. In one embodiment, the application specific logic module may exist in the so called "Application Layer" of the PCI protocol stack 106. As one of ordinary skill in the art will readily realize, this logic may be implemented in firmware software, hardware or any combination thereof. In general the application specific logic contained in the application specific logic module 103 is specifically tailored to control the operation of a specific application. As discussed previously, the master arbiter module 104 controls whether or not the application specific logic module 103 will ultimately have access to the PCI Express adaptor 102.

In normal operation, requests from the application specific logic module 103 are passed to the PCI protocol stack module 106. The PCI protocol stack module 106 includes free running logic that allows for communication between the root complex 101 and the PCI express adaptor 102. The term free running logic refers to the logic in the PCI Express system that, during a recovery action, is not reset or otherwise altered.

When a recovery action is needed in the application specific logic module 103, the fencing module 105 operates to separate the application specific logic module 103 from the PCI protocol stack 106. In one embodiment, the fencing module 106 may include latches. The fencing module and the included latches may receive, and therefore run on, a free-running logic clock signal 110 that runs at a free running clock rate.

The fencing module 105 has at least two states: an inactive state in which is passes all signals and in formation in both directions (i.e., to and from the application specific logic module 103) and an active state in which, and as is explained in greater detail below, serves to separate the free running and recoverable domains.

The root complex 101 may receive two different clock signals. The first clock signal is the free running clock signal 110 which runs at a free running clock rate and is coupled to the fencing module 105 and the PCI protocol stack 106. Having these two separate clock signals allows for the free running portion of the root complex (i.e. fencing module 105 and the PCI protocol stack 106) to continue running, thus giving the appearance that the PCI link is still active, even if the application specific logic module 103 requires that its clock (stoppable clock signal 112) be stopped during a recovery action. The second clock signal is the stoppable clock signal 112, which runs at a stoppable clock signal rate. The stoppable clock signal 112 is received by the master arbiter module 112 and the application specific logic module 103.

The fencing module 105 is coupled between the application specific logic module 103 and the protocol stack 106. As such, all data and control signals transmitted from the application specific logic module 103 to the protocol stack 106 must pass through the fencing module 105.

In operation, the fencing module 105 keeps a copy of the current control signal values (i.e., control bus values for the PCI protocol stack 106) in its included latches. As discussed below, the fencing module 105 may operate in two states, an inactive and active state. In the inactive state, the fencing module 105 continually latches all control values from the application specific logic module 103. In the active state, the fencing module 105 blocks the control values from the application specific logic module 103 and uses the previously latched control values as the control source for the PCI stack.

When a recovery action is taken, the recovery control unit 113 presents a fence indicator signal to the fencing module 105 so that all interface signals from the application specific module 103 are prevented from the being transferred to the PCI protocol stack module 106 (i.e., the free-running clock domain). In particular, the application specific logic module 103 may include a recovery control module 113 that is operated on the free running clock 110 and controls the operation of the fencing modules 105 as well as the generation of the later described quiesce signals as well as controlling the system 100 reset. This recovery control module 113 generates the fence indicator signal which places the fencing module 105 into an active state. In the active state, the fencing module 105 presents the previously stored control values to the PCI protocol stack module 106 and blocks any new signals the application specific logic module 103 from reaching the PCI protocol stack module 106. In addition, in its active state, the fencing module 105 returns all flow control credits to the PCI protocol stack. The return of all of the flow controls credits makes the PCI root complex 101 look idle during a recovery operation.

All control bus values from that point forward are sourced from the copy residing in the latches within the fencing module 105. All interface signals from the free-running domain (i.e. from the protocol stack 106 and the PCI Express adapter 102) are terminated such that they do not compromise the information residing in the application specific logic module 103.

The fencing module 105 also maintains the PCI flow control during recovery. When the fencing module 105 is first placed into an active state (i.e., the application specific logic module 103 is undergoing a recovery) all outstanding credits are returned to the PCI Express adapter 102 thereby opening all PCI Express communication channels. As new requests or completions for outstanding requests come in from the PCI Express adapter 102 during the recovery phase, all credits are returned because all of these requests are terminated at the fence. When the application specific logic module 103 has completed its recovery operations, the control values are replaced in the application specific module and then the fencing module 105 is returned to an inactive state. This helps to ensure that the flow control values will be correct on both sides of the protocol stack module 106 and all channels will be open and available for communication.

In some embodiments, the master arbiter module 104 is configured to arbitrate between multiple internal interfaces which have the ability to send requests to the protocol stack. In one embodiment, the master arbiter module also has the ability to inject a "quiescence message" into the PCI Express adapter when the application specific logic module 103 is about to engage in a recovery action. When a quiescence message is asserted, prior to the presentation of a fence signal to the fencing module 105, the master arbiter module 104 sends a command to the PCI Express adapter 102 to effectively stop the PCI Express adapter from issuing any commands or requests. One way this may be accomplished is to have the master arbiter module 104 send a packet to the PCI Express adapter 102. The packet may be configurable by firmware, but could be hard-coded to target the PCI Command Register in the PCI Express adapter 102 at address offset x04 to set the "Bus Master Enable" control bit to 0. This will effectively keep the PCI Express adapter 102 from issuing any new requests to the application specific logic module 103 while it is in the recovery phase. After the master arbiter module 105 has sent this request it will indicate such to the recovery control logic module 113, thus allowing the fence indicator to be asserted and the recovery action to be taken.

In one embodiment, the recovery action includes logging all possible information from the application specific logic module 103 and then resetting it. This logging may include stopping the stoppable clock signal 112 and scanning of all latches residing in the application specific logic module 103.

The reset clears all problems from the recoverable domain. After reset, the recoverable control logic for the PCI control interfaces are then set to the same state as prior to the recovery action. It is then possible to drop the fence indicator, reconnecting the recoverable logic to the free-running PCI stack logic and thereby restoring communication to the attached PCI Express adapter.

Figure 2:
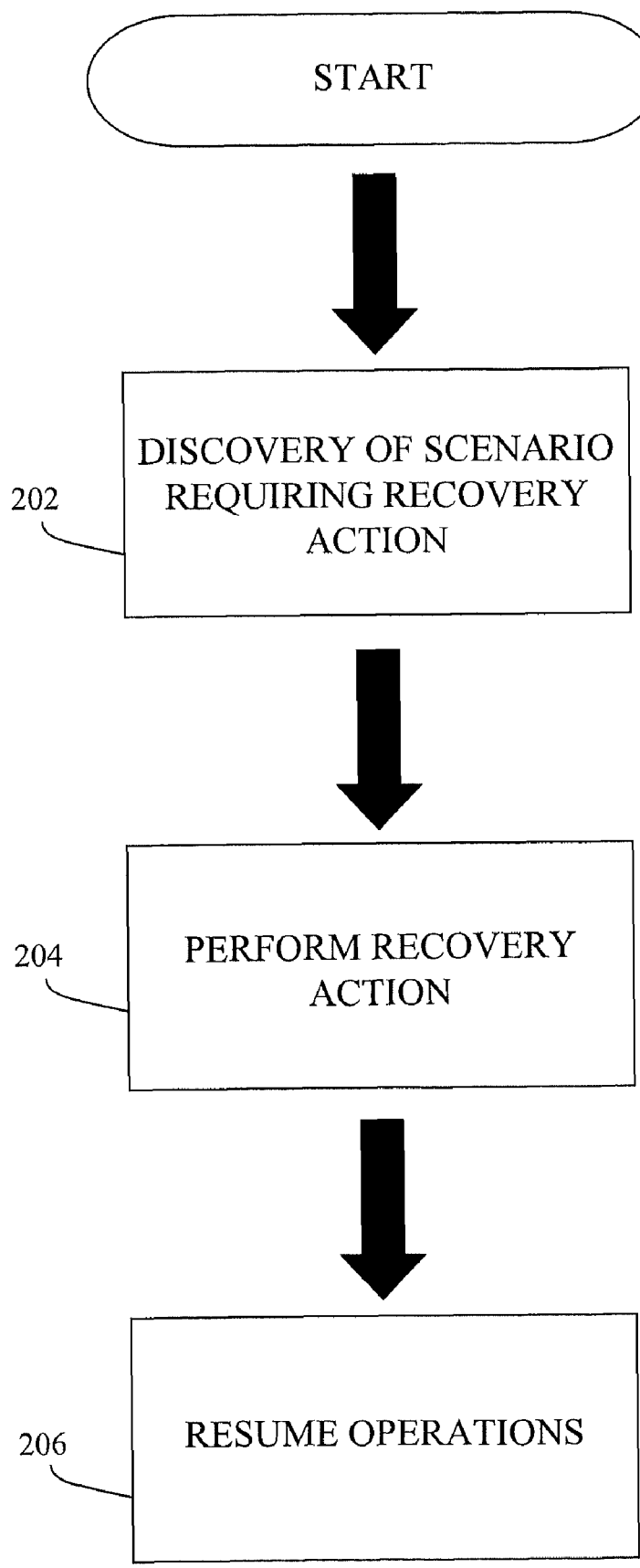
FIG. 2 is a flow chart showing a high level flow diagram of one possible method of performing a recovery operation according to an embodiment of the present invention.

FIG. 2 is a flow chart showing one possible method for accomplishing a recovery without loosing any memory mapped information in the PCI Express adapter 102. One of ordinary skill in the art will readily realize that the flow of FIG. 2 is illustrative only. The steps shown are not all required to practice the instant invention and, in some instances, the order the steps are performed may be modified.

The method of this embodiment begins at step 202 with the discovery of scenario within the application specific logic module 103 that a recovery action is needed. One example of a scenario indicating that a recovery action may be necessary is the discovery of an internal error in the application specific logic module 103. Such errors may be discovered by well known conventional error detection methods.

The method continues to step 204 where the recovery action is performed. As discussed above, in the prior art this step may have included specifying sticky bits in configuration space (typically stored in configuration registers located in the PCI Express adapter) which must stay valid after a reset recovery action. All other memory regions and other pertinent memory space in the adapter may be reset during such actions. To ensure that this information stays valid while the root complex is being recovered so as maintain the information for debug purposes after recovery, the connection needs to appear to remain open. As discussed with respect to FIG. 3, embodiments of the present invention alter this process in such a way that it keeps adapters active while the root complex goes through a recovery action in order to preserve the adapter memory contents. This allows logging of adapter memory locations which are not "sticky-bit" registers after a recovery action has taken place.

The process continues in step 206 where the operation of the root complex is resumed. This step may include reading and logging all the memory in the PCI Express adapter 102 and resetting the entire PCI Express network.

Figure 3:
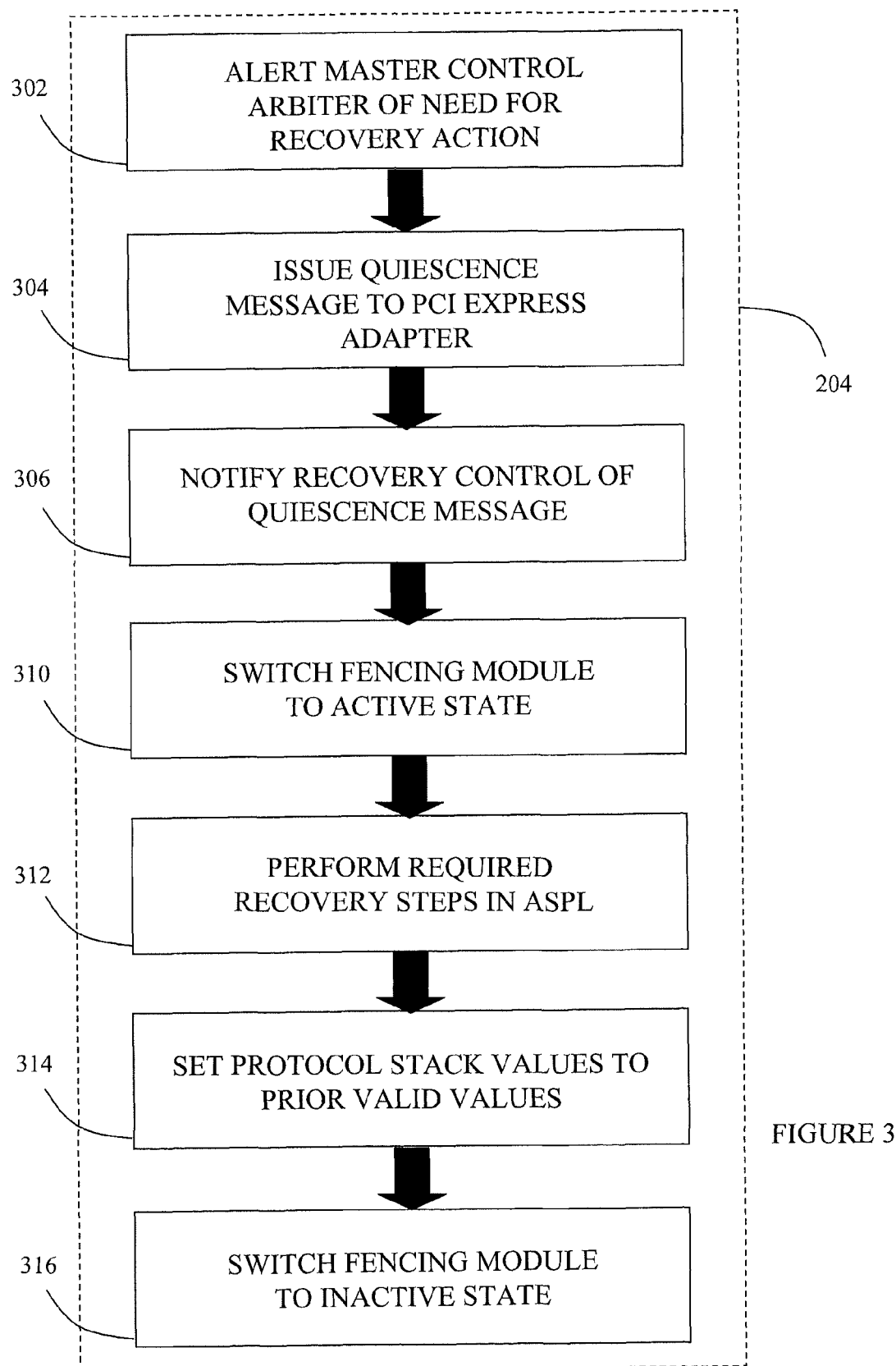
FIG. 3 is a more detailed flow chart of a portion of the method shown in FIG. 2.

FIG. 3 shows a more detailed flow chart of step 204 shown in FIG. 2. As discussed above, after the application specific logic 103 has determined that a recovery action is required (step 202). The process progresses to step 204 where the recovery action is performed. In one embodiment the first step of performing the recovery action is to alert the master arbiter module 104 of a need for a recovery action at step 302. As discussed above this may be accomplished when the recovery control logic 113 presents a signal to the master arbiter module 104.

In step 304 the master arbiter module 104 issues a quiescence message to the PCI express adaptor 102. As discussed above the issuance of this quiescence message may set the bus master enable control bit of the PCI Express adapter 102 to zero and thereby effectively inhibit the PCI express adaptor 102 from issuing any new requests to the application specific logic module 103.

In step 306 the application specific logic is notified that the quiescence message has been issued in step 306. Of course, and as one of ordinary skill in the art will readily realize, the application specific logic module 106 may be simultaneously notified when the quiescence message is issued.

Regardless, after the quiescence message has been issued the fencing module 105 is placed into an active state in step 308. Placing the fencing module 105 in an active state will cause the fencing module 105 to block all commands and data transfers that may emerge from the application specific logic module 103.

In step 310 the actual recovery steps required to recover the application specific logic module 103 are performed.

Upon completion of the recovery action, and before the fencing module has been placed back into its inactive state, in step 314 the values in the protocol stack module are 106 reloaded by firmware. This insures that prior valid values are present when the recovery action is completed. Finally, after the prior values have been updated, in step 316 the fencing module 105 is switched to an inactive state.

This method will keep the connected adapters alive while the root complex goes through a recovery action to protect the main system. This allows logging of adapter memory locations which are not "sticky-bit" registers after a recovery action has taken place. In some instances, a final reset of the entire sub-system is required to clean up As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
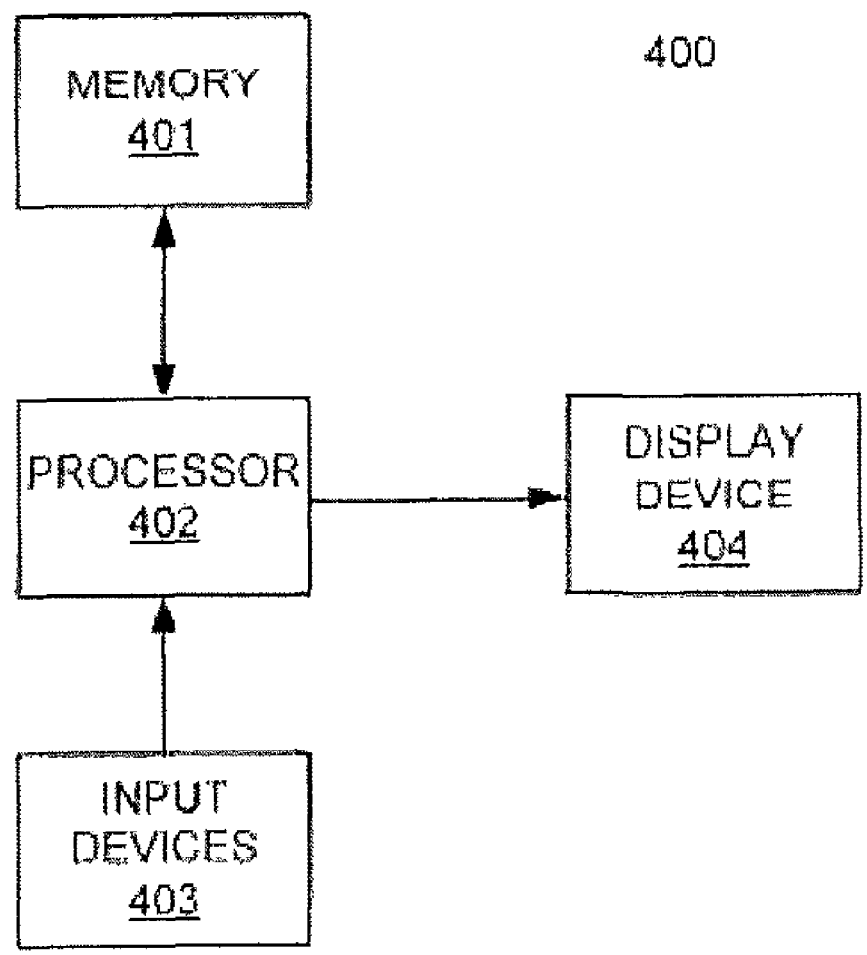
FIG. 4 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 4 illustrates a computer apparatus, according to an exemplary embodiment. Therefore, portions or the entirety of the methodologies described herein may be executed as instructions in a processor 402 of the computer system 400. The computer system 400 includes memory 401 for storage of instructions and information, input device(s) 403 for computer communication, and display device 404. Thus, the present invention may be implemented, in software, for example, as any suitable computer program on a computer system somewhat similar to computer system 400. For example, a program in accordance with the present invention may be a computer program product causing a computer to execute the example methods described herein.

The computer program product may include a computer-readable medium having computer program logic or code portions embodied thereon for enabling a processor (e.g., 402) of a computer apparatus (e.g., 400) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While the invention has been described with reference to illustrative embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A PCI Express system comprising: a PCI Express adapter; and a PCI Express root complex coupled to the PCI Express adapter, the PCI Express root complex including: a protocol stack coupled to the PCI express adapter and configured to transmit information to and receive information from the PCI express adapter; an application specific logic module including a recovery control unit; and a fencing module coupled between the application specific logic module and the protocol stack and configured to, when in recovery operation, block all signals from the application specific logic module from reaching the protocol stack.

2. The system of claim 1, further comprising:
a master arbiter coupled between an output of the application specific logic module and the PCI Express adapter and configured to receive a signal from the application specific logic module that the application specific logic module is about to perform a recovery action.

3. The system of claim 1, wherein the fencing module receives a free running clock signal having a free running clock rate and the application specific logic module receives a stoppable clock signal having a stoppable clock rate.

4. The system of claim 2, wherein the master arbiter is configured to receive signals from the application specific logic module and another module and determine which module should be granted access to the PCI Express adapter.

5. The system of claim 2, wherein the master arbiter includes an output coupled to the fencing module.

6. The system of claim 1, wherein the fencing module has an inactive state and an active state and is configured to receive a signal from the application specific logic module to place the fencing module in the active state.

7. The system of claim 5, wherein the master arbiter is configured to present a signal to the PCI Express adapter to disable the PCI Express adapter from issuing any requests to the PCI root complex.

8. The system of claim 6, wherein the stoppable clock rate is different than the free running clock rate for at least a portion of a time period that the fencing module is in the active state.

9. The system of claim 7, wherein the fencing module has an inactive state and an active state and is configured to receive a signal from the application specific logic module to place the fencing module in the active state.

10. The system if claim 9, wherein the active state of fencing module causes the fencing module to return all credits to the PCI Express adapter and to block all signals from the application specific logic module.

11. A computer program product including a computer readable medium with program segments for, when executed on a computer device, causing the computer device to implement a method for performing a recovery operation in a PCI Express root complex, the method comprising: determining that a portion of the PCI root complex requires a recovery operation; receiving at an arbiter module an indication that a portion of the PCI root complex requires a recovery operation; providing a disable signal to a PCI Express adapter which disables write functionality of the PCI Express adapter during the recovery operation; and returning all flow control credits to a PCI protocol stack.

12. The computer program product of claim 11, further comprising program segments for:
providing a fencing signal to the fencing module that causes the fencing module to enter an active state.

13. The computer program product of claim 11, further comprising program segments for:
performing the recovery action; and
resetting the PCI Express system.

14. The computer program product of claim 12, wherein the portion of the PCI Express root complex requiring the recovery action provides the fencing signal to the fencing module, the fencing signal being provided after the disable signal has been provided to the PCI Express adapter.

15. The computer program product of claim 12, further comprising program segments for:
blocking all signals from the portion of the PCI root complex requiring a recovery action after the fencing signal has been provided.

16. A method of performing a recovery action on an application specific logic module of a PCI Express root complex comprising: receiving a fencing signal at a fencing module; blocking, in the fencing module, all signals received from the application specific logic module from reaching a portion of the PCI Express root complex which is capable of communication with a PCI Express adapter during the recovery action; and returning all flow control credits to the PCI Express adapter.

17. The method of claim 16, wherein the step of receiving includes receiving the fencing signal from a recovery control unit portion of an application specific logic module.

18. The method of claim 17, further comprising;
disabling write functionality of the PCI Express adapter.

* * * * *